April 6, 1954 F. J. KUHN 2,674,103
FROZEN FOOD CABINET
Filed March 3, 1953
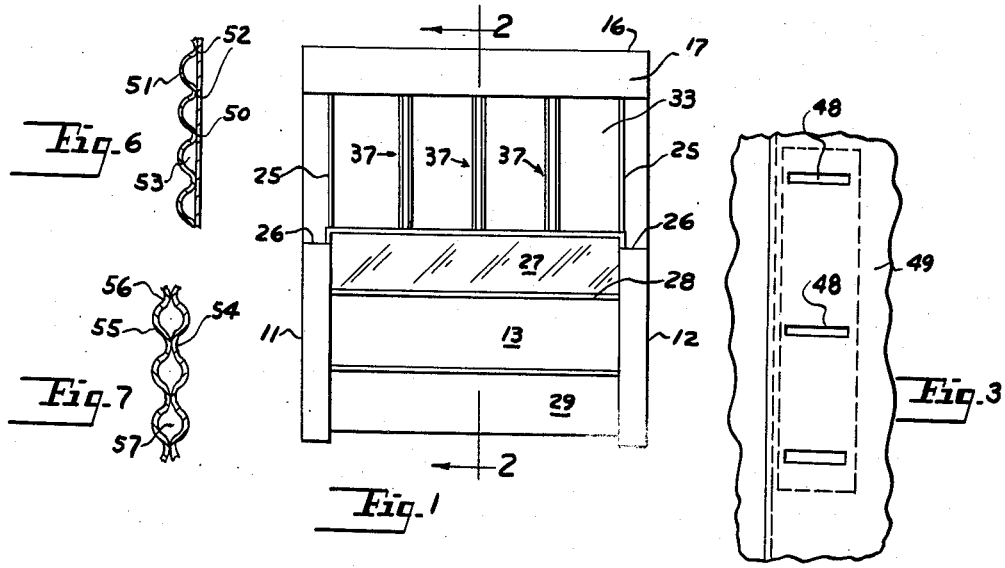
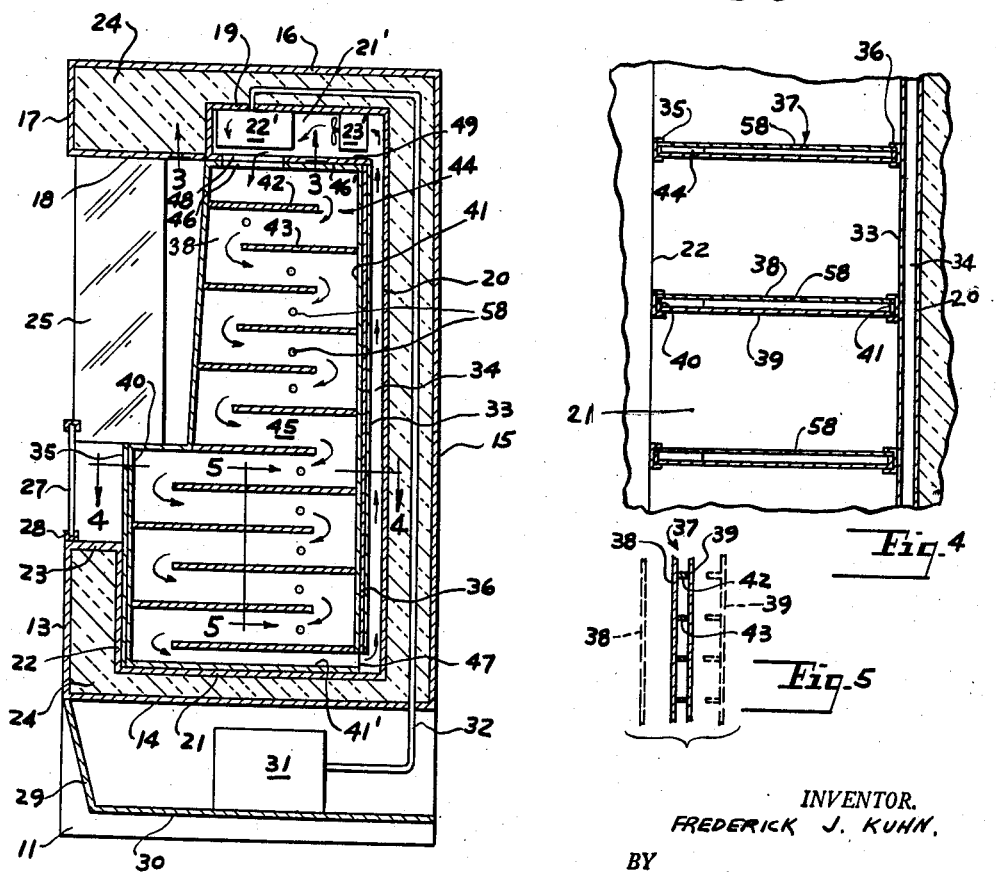
INVENTOR.
FREDERICK J. KUHN.
BY
Robert A. Sloman
ATTORNEY.

Patented Apr. 6, 1954

2,674,103

UNITED STATES PATENT OFFICE 2,674,103

FROZEN FOOD CABINET

Frederick J. Kuhn, Detroit, Mich.

Application March 3, 1953, Serial No. 340,084

4 Claims. (Cl. 62—102)

1

This invention relates to a frozen food cabinet having an insulated storage space together with a plurality of air cooled compartment defining partitions therein.

It is the object of the present invention to provide a novel food storage cabinet, wherein the partitions are cooled and maintained cool by a continuous flow of refrigerated air therethrough.

It is the further object of this invention to provide within said cabinet an air cooling compartment and an air duct commmunicating therewith and with refrigerating mechanism for continuously translating cooled air from said cooling compartment, through said partitions and through said duct back to said cooling compartment.

It is the further object of this invention to provide a simplified cooling partition structure whereby cold air may be effectively circulated therethrough.

These and other objects will be seen from the following specification and claims in conjunction with the appended drawing, in which:

Fig. 1 is a front elevational view of the present frozen food cabinet.

Fig. 2 is a section on line 2—2 of Fig. 1 on an enlarged scale.

Fig. 3 is a fragmentary section taken on line 3—3 of Fig. 2.

Fig. 4 is a fragmentary section taken on line 4—4 of Fig. 2.

Fig. 5 is a section taken on line 5—5 of Fig. 2 and showing in phantom the corrresponding parts before assembly.

Fig. 6 is a view similar to Fig. 5 showing a slightly different form of partition construction; and Fig. 7 is another view similar to Fig. 5 illustrating still another form of compartment construction.

It will be understood that the above drawing illustrates merely a preferred embodiment of the invention, and that other embodiments are contemplated within the scope of the claims hereafter set forth.

Referring to Figs. 1 and 2, the present frozen food cabinet includes the spaced hollow upright insulated end walls 11 and 12 with the upright front wall element 13 interposed therebetween. Said front wall terminates in the horizontal rearwardly extending bottom wall 14 which joins the upright rear wall 15. Top wall 16 terminates in the front wall element 17, the lower portion of which terminates in the rearwardly extending top wall element 18, shown in Fig. 2. Interior upright wall 20 terminates at its upper end in the top wall element 19 which in cooperation with top wall element 49 defines the cooling com-

2 partment 21' within which is positioned a conventional heat exchanger 22' and a suitable fan 23'. Wall element 20 terminates at its lower end in the interior storage compartment defining bottom wall 21, and this wall at its front end terminates in the upwardly extending inner wall 22. This latter inner wall 22 terminates at its upper end in the platform 23, whose outer edge corresponds with the upper edge of the front wall element 13.

A suitable insulation 24 is interposed between the above described wall elements to thereby define upon the interior of said cabinet an insulated storage space. The rectangularly shaped upright windows 25 are arranged upon opposite sides of said cabinet and rest upon the upper ends 26 of the hollow side walls 11 and 12, and extend upwardly to the overhanging top wall element 18 to thereby provide a side closure for said cabinet yet permitting visual access to the interior thereof.

The upright rectangular glass window 27 is positioned upon the platform 23 and is secured within the molding 28 of U-shape in cross-section to thereby provide an additional front closure for the storage space permitting visual access to said storage space.

The above described wall elements of said cabinet as well as the windows 25 and 27 thereby define an insulated storage space within the cabinet with physical access thereto being provided between the top wall element 18 and the upper longitudinal edge of the window 27.

Front wall element 13 also terminates in the rearwardly and downwardly inclined wall 29 which in turn terminates in the rearwardly extending platform upon which is mounted a conventional refrigerating unit 31 adapted to supply a suitable refrigerant tube 32 which joins heat exchanger 22' within cooling compartment 21'.

The upright interior rear wall 33 within said cabinet is spaced forwardly of upright wall 20 to thereby define the upright air passage 34 which communicates at its upper end with the cooling compartment 21'.

Arranged within said cabinet and upon the interior walls 22 and 33 defining portions of said storage space are a plurality of opposed pairs of upright channel elements 35 and 36 which cooperatively receive the front and rear upright edges of the cooling partitions, generally designated at 37.

A plurality of such hollow partitions are positioned within said storage space in parallel spaced relation to thereby define a plurality of compartments within said storage space.

Said partitions include the opposed upright parallel spaced walls 38 and 39 and the end walls 40 and 41, as shown in Fig. 4. Said partitions also have the top wall elements 46' and the bottom wall elements 41' to thereby complete the enclosure of said partitions through which cooled air will circulate in the manner hereafter described.

Horizontally disposed in staggered relation upon the interior of each hollow partition are a plurality of flat partition elements 42 and 43, the opposite ends of said adjacent partition elements being apertured or cut away as at 44 to thereby define throughout said partition a circuitous passageway 45 for the flow of refrigerated air from the cooling compartment 21'.

The top wall 46' of each of the partitions 37 has an elongated slot or inlet 46, which is in communication with a corresponding transverse slot or outlet 48 formed in the bounding wall 49 of said cooling compartment 21'.

At the lower end of each partition there is formed in the end wall 41 an air outlet 47 communicating with the lower end of the air duct 34.

By this construction the refrigerated air impelled by the fan 23' moves past the refrigerating heat exchanger 22' and flows downwardly through the circuitous passageway 45 of each of the upright hollow partitions with the return flow back to the cooling compartment through the air duct 34. By this construction the flow of refrigerated air maintains the side walls 38 and 39 at the desired degree of coldness for effectively refrigerating the various compartments defined by said partitions within the storage space of said cabinet.

As shown in Fig. 5, the partition 58 may be formed, for example, by securing all of the partition elements 42 and 43 to one of the partition walls 39 and by suitably securing the other partition wall 38 to the longitudinal edges of said partition elements.

It is contemplated that various types of constructions could be employed in the making of the partition elements 37, such as will assure a flow and uniform distribution of refrigerated air through said compartments.

A slight variation of partition construction is shown in Fig. 6 wherein one side wall 50 is plain and the opposing side wall 51 corrugated defining a plurality of suitably interconnected passageways 53. The contacting portions 52 of the partition element 51 may be secured to partition element 50 in any convenient manner, such as by welding or riveting.

Another slight variation of partition construction is fragmentarily shown in Fig. 7, wherein both of the partition elements 54 and 55 are corrugated with the contacting portions 56 suitably interconnected, such as by welding, to thereby define a plurality of suitably interconnected passage elements 57 for circulating refrigerated air through the partitions.

It is contemplated that transverse apertures 58 may be formed through one or both of the side walls 38 and 39 of partitions 37 to permit the escape of refrigerated air into said compartments.

Having described my invention, reference should now be had to the claims which follow for determining the scope thereof.

I claim:

1. In a frozen food cabinet having an insulated storage space and an air cooling compartment thereabove having a plurality of slotted air outlets, a heat exchanger of a refrigerating unit and a fan in said cooling compartment, a plurality of upright spaced hollow partitions positioned within said storage space, said cabinet having an upright air duct therein communicating with said cooling compartment, each partition having an inlet and an outlet respectively in communication with a cooling compartment outlet and with said duct, whereby refrigerated air is constantly recirculated through said partitions, duct, and cooling compartment, each partition having a plurality of parallel spaced staggered partition elements defining a circuitous air passage through said partitions.

2. In a frozen food cabinet having an insulated storage space and an air cooling compartment thereabove having a plurality of slotted air outlets, a heat exchanger of a refrigerating unit and a fan in said cooling compartment, a plurality of upright spaced hollow partitions positioned within said storage space, said cabinet having an upright air duct therein communicating with said cooling compartment, each partition having an inlet and an outlet respectively in communication with a cooling compartment outlet and with said duct, whereby refrigerated air is constantly recirculated through said partitions, duct, and cooling compartment, and opposed upright channels upon the interior walls of said cabinet bounding said storage space supportably receiving the front and rear edges of said partitions.

3. In a frozen food cabinet having an insulated storage space and an air cooling compartment thereabove having a plurality of slotted air outlets, a heat exchanger of a refrigerating unit and a fan in said cooling compartment, a plurality of upright spaced hollow partitions positioned within said storage space, said cabinet having an upright air duct therein communicating with said cooling compartment, each partition having an inlet and an outlet respectively in communication with a cooling compartment outlet and with said duct, whereby refrigerated air is constantly recirculated through said partitions, duct, and cooling compartment, said partitions having a plurality of transverse apertures in their side walls permitting the escape of refrigerated air into said storage space.

4. In a frozen food cabinet having an insulated storage space with a bounding rear wall and an air cooling compartment thereabove, a horizontally disposed partition wall separating said space and compartment and having a plurality of longitudinally spaced slotted air outlets formed therethrough, a heat exchanger of a refrigerating unit and a fan in said cooling compartment, a plurality of upright spaced hollow partitions positioned within said storage space extending up to said partition wall and rearwardly to said rear wall, said cabinet having an upright air duct rearwardly of said rear wall communicating with said cooling compartment, each partition having an inlet at its upper end and an outlet at its lower end respectively in communication with a cooling compartment outlet and with said duct at its lower end, whereby refrigerated air is constantly re-circulated through said partitions, duct and cooling compartment.

References Cited in the file of this patent

UNITED STATES PATENTS

| Number | Name | Date |
|---|---|---|
| 2,437,451 | Baird | Mar. 9, 1948 |
| 2,529,734 | Lehmann | Nov. 14, 1950 |